(12) United States Patent
Fourmy et al.

(10) Patent No.: US 8,618,777 B2
(45) Date of Patent: Dec. 31, 2013

(54) METHOD AND DEVICE FOR REGULATION OF A ROTARY ELECTRICAL MACHINE FOR A MOTOR VEHICLE

(75) Inventors: Stéphane Fourmy, Vitry sur Seine (FR); Raymond Rechdan, Villecresnes (FR)

(73) Assignee: Valeo Equipements Electriques Moteur, Creteil (FR)

( * ) Notice: Subject to any disclaimer, the term of this patent is extended or adjusted under 35 U.S.C. 154(b) by 449 days.

(21) Appl. No.: 13/071,700

(22) Filed: Mar. 25, 2011

(65) Prior Publication Data

US 2011/0234178 A1    Sep. 29, 2011

(30) Foreign Application Priority Data

Mar. 26, 2010   (FR) ...................................... 10 52194

(51) Int. Cl.
*H02H 7/06*   (2006.01)
(52) U.S. Cl.
USPC .............................................. 322/28; 322/37
(58) Field of Classification Search
USPC .............................................. 322/25, 28, 37
See application file for complete search history.

(56) References Cited

U.S. PATENT DOCUMENTS

| | | | | |
|---|---|---|---|---|
| 5,929,619 A * | 7/1999 | Chin et al. | ..................... | 323/283 |
| 6,392,372 B1 * | 5/2002 | Mays, II | ................... | 318/400.01 |
| 6,737,834 B2 * | 5/2004 | Pierret et al. | ..................... | 322/28 |
| 6,798,176 B2 * | 9/2004 | Pierret | ............................. | 322/28 |
| 6,985,821 B2 * | 1/2006 | Kawabata | ....................... | 702/64 |

FOREIGN PATENT DOCUMENTS

| | | |
|---|---|---|
| DE | 10 2008 000 147 | 7/2009 |
| FR | 2 845 837 | 4/2004 |
| WO | WO 2006/029582 | 3/2006 |

\* cited by examiner

*Primary Examiner* — Nicholas Ponomarenko
(74) *Attorney, Agent, or Firm* — Berenato & White, LLC

(57) ABSTRACT

A rotary electrical machine regulation device of the type which can control the electrical machine using a predetermined set value of a direct voltage (B+) of the on-board electrical network of the vehicle in which the machine is installed. An excitation current (EXC) is supplied to the alternator (machine), and has a duty cycle (RC) which is determined by a digital processing block (9), on the basis of an error voltage between the predetermined set value and the direct voltage of the electrical network. Accordingly, a system (11) is provided herein for making the digital block electrically self-sufficient. The system includes a voltage maintenance device with a self-sufficient capacitor (110), and a self-sufficient control element (111).

8 Claims, 4 Drawing Sheets

METHOD AND DEVICE FOR REGULATION OF A ROTARY ELECTRICAL MACHINE FOR A MOTOR VEHICLE

This application is a Utility Patent Application, and claims priority to French patent application No. 10/52194 filed Mar. 26, 2010.

FIELD OF THE INVENTION

The present invention relates to a device for regulation of a polyphase rotary electrical machine, in particular of the alternator or alternator-starter type, which equips motor vehicles. The invention also relates to a rotary electrical machine which uses this device.

BACKGROUND OF THE INVENTION

In the field of motor vehicles, it is well known to maintain the voltage which is supplied to the on-board electrical network by the vehicle alternator at a predetermined set value, independently of the speed of rotation of the engine or the electrical consumption of the equipment, by means of a so-called "regulator" device.

Nowadays, vehicle parts manufacturers have developed very high-performance alternators and alternator starters by using electronic regulators which are based on digital technology.

However, the electronic regulators can be sensitive to micro-cuts in their electrical supply, and to transitory disturbances which are transmitted by the on-board network.

SUMMARY OF THE INVENTION

The object of the present invention is thus to improve the resistance of an electronic regulator to micro-cuts in the electrical supplies, and to transitory disturbances which are transmitted by the on-board network of the vehicle.

Its subject is specifically a device for regulation of a polyphase rotary electrical machine for a motor vehicle, of the type which can bring under the control of a predetermined set value a direct voltage of an on-board electrical network which is supplied by this machine, by controlling by means of an analogue control block a periodic excitation current with a duty cycle which is determined by a digital processing block, on the basis of an error voltage between the predetermined set value and the direct voltage of the electrical network, the device comprising a system for making the digital processing block electrically self-sufficient, and the system comprising voltage maintenance means with a self-sufficient capacitor in order to provide a self-sufficient supply voltage which supplies exclusively the digital processing block.

The regulation device according to the invention is distinguished in that it comprises self-sufficient control means to control the self-sufficiency of the digital processing block according to the amplitude of the self-sufficient supply voltage, and in that the self-sufficient control means comprise means for stopping at least one clock of the digital processing block when the self-sufficient supply voltage is lower than a reference supply voltage of the digital block.

In addition, these same self-sufficient control means advantageously comprise means for re-initialisation of at least one digital control circuit of the digital processing block, when the self-sufficient supply voltage is lower than a reference re-initialisation voltage of the digital block.

The device for regulation of a polyphase rotary electrical machine for a motor vehicle, according to the invention, is also distinguished in that the capacitor of the voltage maintenance means with self-sufficient capacity is connected to the on-board network by at least one anti-return diode.

Highly advantageously, the voltage maintenance means with self-sufficient capacity comprise means for limitation of the self-sufficient supply voltage; these limitation means preferably comprise at least one Zener diode.

Alternatively, the voltage maintenance means with self-sufficient capacity comprise means for regulation of the self-sufficient supply voltage, these regulation means preferably comprising at least one comparator and a switching element such as a transistor.

The invention also relates to a polyphase rotary electrical machine for a motor vehicle which can function as a generator, comprising a regulation device which has the characteristics specified above.

These few essential specifications will have made apparent to persons skilled in the art the advantages which are provided by the regulation device according to the invention, in comparison with the prior state of the art.

The detailed specifications of the invention are given in the following description which is provided in association with the appended drawings. It should be noted that these drawings have no purpose other than to illustrate the text of the description, and do not constitute in any way a limitation of the scope of the invention.

DESCRIPTION OF THE PREFERRED EMBODIMENTS OF THE INVENTION

Figure 1:
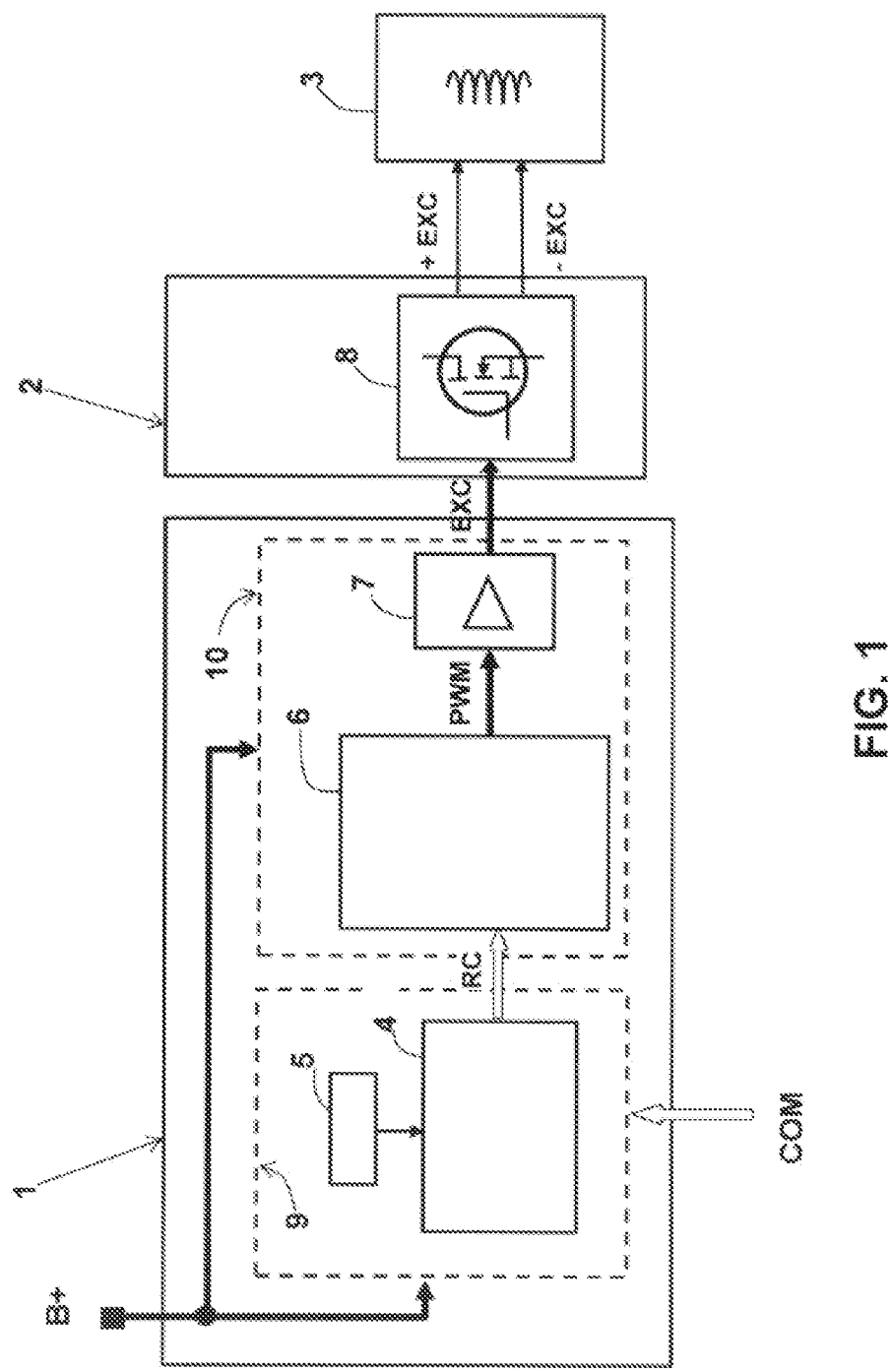
FIG. 1 is a synoptic diagram of a device for regulation of a polyphase rotary electrical machine for a motor vehicle, comprising a digital processing block and an analogue control block known according to the prior art.

The synoptic diagram in FIG. 1 relates to a device in accordance with the prior art, including different elements of the regulation device type 1, 2 according to the invention.

This regulation device 1, 2 comprises substantially two parts 1, 2, i.e.: a control circuit 1 and power electronics 2 comprising transistors 8 of the MOSFET type (transistor with an isolated gate field effect), to control the excitation current +EXC, −EXC which is applied to the excitation coil 3 of the rotary electrical machine. It will be noted that the circuits 1 and 2 can be produced in the form of a single ASIC of the so-called monolithic type.

The control circuit 1 comprises in particular:
  a digital processing block 9 comprising a digital control circuit 4 and a real time clock system 5; and
  an analogue control block 10 comprising a PWM pulse generator 6, the duty cycle RC of which is determined by the digital control circuit 4; and a signal adaptation circuit 7 known as a driver for these PWM pulses producing the control signals EXC for the transistors 8 of the power electronics 2. It will be noted here that the circuit 7 can comprise an amplifier and a booster pump circuit.

The set value of the regulation loop is in this case set via an interface circuit which is connected by means of a communication line COM to an engine control unit (not shown) of the vehicle.

The digital processing block 9 which is constituted by the digital control circuit 4 and the clock system 5, and the analogue control block 10 which is constituted by the PWM pulse generator 6 and its signal adaptation circuit 7, are supplied in parallel by the on-board electrical network B+.

In general, the minimal operating voltage of the control circuit 1 of a regulator 1, 2 is between 5V and 8V.

Certain transitory disturbances on the on-board electrical network B+ produce voltage "gaps" or micro-cuts, the level of which drops below the minimum operating voltage of the regulator 1, 2, and which can be the cause of malfunctioning.

According to the invention, there is put into place in the control circuit 1 a system for making the digital processing block 9 electrically self-sufficient, which permits satisfactory operation of the regulator 1, 2, even in the event of micro-cuts of the on-board electrical network B+.

Figure 2:
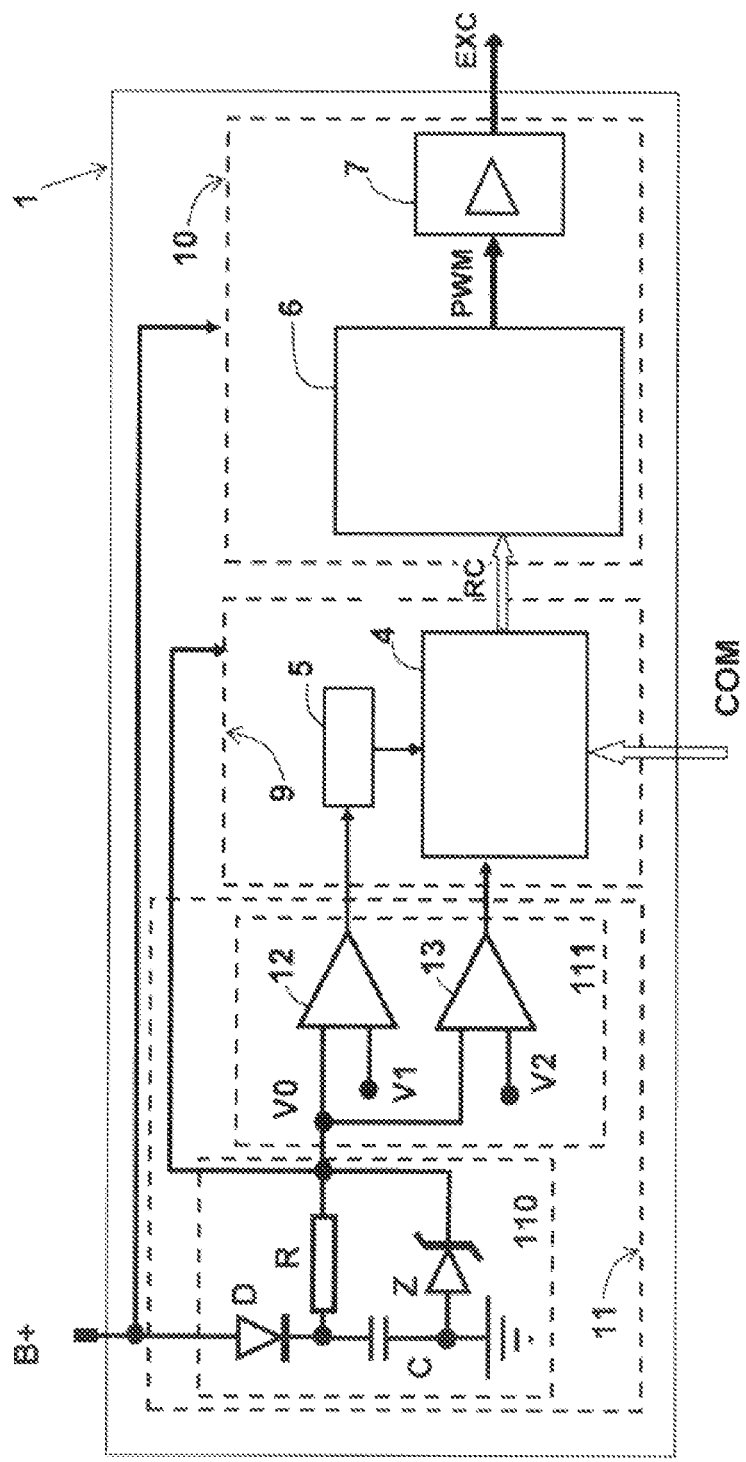
FIG. 2 is a synoptic diagram showing the arrangement of the digital processing block and the analogue control block in a device for regulation of a polyphase rotary electrical machine for a motor vehicle, according to the invention.

FIG. 2 shows schematically a technical solution to this problem, which according to the invention consists of putting into place in the control circuit 1 a system 11 for creation of electrical self-sufficiency, such that the digital processing block 9 continues to be supplied with a self-sufficient supply voltage V0, even during micro-cuts of the on-board network B+. The system 11 for creation of electrical self-sufficiency comprises a voltage maintenance circuit 110 with a self-sufficient capacitor C and a self-sufficient control circuit 111.

The invention advantageously makes it possible to use a self-sufficient capacitor C with a low value, for example approximately 600 pF, according to a particular embodiment. This is made possible, as will become more apparent hereinafter, firstly because of the fact that the supply voltage is maintained, by means of the capacitor C, only for the digital block 11, and secondly because of the self-sufficient control carried out by the circuit 111. It will be noted here that the low value of self-sufficient capacity allowed by the invention permits easy integration of this capacitor C in a regulator according to the invention produced in the form of an ASIC.

In this particular embodiment, the self-sufficient voltage maintenance circuit 110 comprises the self-sufficient capacitor C, a diode D, a resistor R, and a Zener diode Z.

The diode D is an anti-return diode between the capacitor C and the on-board electrical network B+. This diode D prevents the discharge of this capacitor C onto the network B+ during micro-cuts and electrical disturbances.

The resistor R and the Zener diode Z assure levelling and limitation of the self-sufficient supply voltage V0.

The self-sufficient control strategy which is implemented by means of the self-sufficient control circuit 111 is now described with reference also to FIG. 3.

Figure 3:
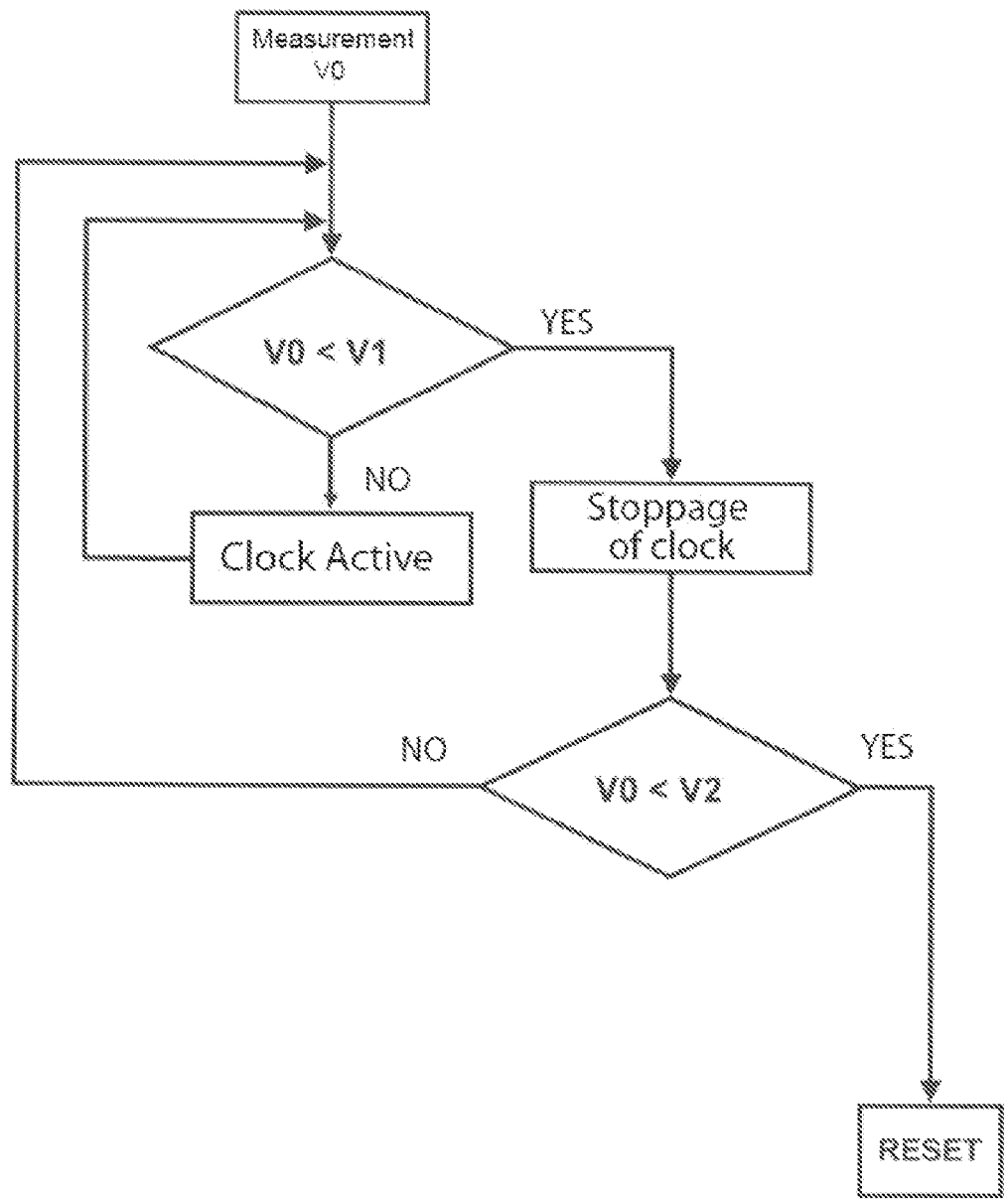
FIG. 3 is a diagram showing the functioning of a voltage maintenance circuit with self-sufficient capacity included in the regulation device according to the invention.

As the diagram in FIG. 3 shows, this strategy consists of implementing in the system 11 for creation of self-sufficiency means 12 for stoppage of the clock system 5 of the digital processing block 9, when the self-sufficient supply voltage V0 can no longer be maintained by the self-sufficient voltage maintenance circuit 110 at a value which is at least equal to a reference supply voltage V1 of the digital block 9. The reference supply voltage V1 of the digital block 9 is approximately 3V in this particular embodiment.

Stoppage of the clocks which are supplied by the clock system 5 makes the digital block 9, and in particular the digital control circuit 4, go into a state of negligible consumption. In this state, the digital values which are contained in the registers of the digital block 9 are protected integrally. As previously stated in the description, this negligible state of consumption of the digital block 9 permits the use of a self-sufficient capacitor C with a low value.

The digital control circuit 4 is supplied by the self-sufficient voltage maintenance circuit 110 with voltage amplitude which is sufficient to protect the digital values in the registers until the self-sufficient supply voltage V0 drops below a reference re-initialisation voltage V2 of the digital block 9.

When the self-sufficient supply voltage V0 drops below V2, re-initialisation means 13 which the self-sufficient control circuit 111 comprises give rise to the re-initialisation of the digital control circuit 4.

The reference re-initialisation voltage V2 of the digital block 9 must have a level, generally of approximately 1V, which is sufficient for the registers of the digital control circuit 4 to remain in a determinist state before the re-initialisation takes place.

Figure 4:
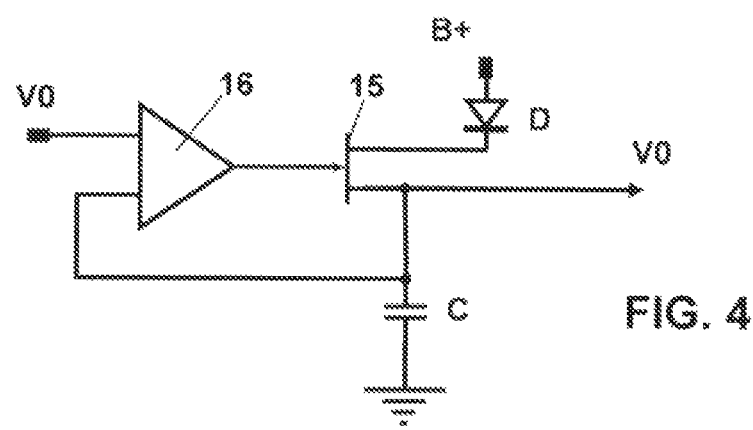
FIG. 4 shows a particular embodiment of the voltage maintenance circuit with self-sufficient capacity included in the regulation device according to the invention.

FIG. 4 shows an embodiment 110' of the self-sufficient voltage maintenance circuit which is improved in comparison with the circuit in FIG. 2.

In this embodiment, a switching element such as a transistor 15 is provided, as well as a comparator 16 to regulate to an optimum value the self-sufficient supply voltage V0 which is obtained at the terminals of the capacitor C of the self-sufficient voltage maintenance circuit 110'.

It will be appreciated that the invention is not limited simply to the particular embodiments described in the description.

In particular, the types of electronic components cited are indicated purely by way of examples. Implementation of any other type of component which has the same functionality would merely constitute variant embodiments.

These other embodiments would not be outside the scope of the present invention, provided that the characteristics of the regulation device are in accordance with the following claims.

The invention claimed is:

1. A regulation device (1, 2) for controlling a polyphase rotary electrical machine which device can bring control to said machine using a predetermined set value of a direct voltage (B+) of an on-board electrical network which is supplied by said machine, comprising:
    an analogue control block (10) having a periodic excitation current (+EXC, −EXC) with a duty cycle (RC) which is determined by a digital processing block (9), on the basis of an error voltage between said predetermined set value and said direct voltage (B+) of the on-board electrical network;
    a system (11) for making said digital processing block (9) electrically self-sufficient, said system (11) comprising voltage maintenance means, with a self-sufficient capacitor (110), for providing a self-sufficient supply voltage (V0) which supplies exclusively said digital processing block (9); and
    a self-sufficient control means (111) for controlling the self-sufficiency of the digital processing block (9) according to the amplitude of the self-sufficient supply voltage (V0), wherein said self-sufficient control means (111) comprise means (12) for stopping at least one clock (5) of said digital processing block (9) when said self-sufficient supply voltage (V0) is lower than a reference supply voltage (V1) of said digital block (9).

2. The regulation device (1, 2) for a polyphase rotary electrical machine for a motor vehicle, according to claim 1, wherein said self-sufficient control means (111) further comprise means (13) for re-initialization of at least one digital control circuit (4) of said digital processing block (9), when said self-sufficient supply voltage (V0) is lower than a reference re-initialization voltage (V2) of said digital block (9).

3. The regulation device (1, 2) for a polyphase rotary electrical machine for a motor vehicle, according to claim 1, wherein said capacitor (C) of said voltage maintenance means with said self-sufficient capacitor (110) is connected to said on-board network (B+) by at least one anti-return diode (D).

4. The regulation device (1, 2) for a polyphase rotary electrical machine for a motor vehicle, according to claim 3, wherein said voltage maintenance means with said self-sufficient capacitor (110) comprise means (R, Z) for limitation of said self-sufficient supply voltage (V0).

5. The regulation device (1, 2) for a polyphase rotary electrical machine for a motor vehicle, according to claim 4, wherein said limitation means comprise at least one Zener diode (Z).

6. The regulation device (1, 2) for a polyphase rotary electrical machine for a motor vehicle, according to claim 1, wherein said voltage maintenance means with said self-sufficient capacitor (110) comprise means (15, 16) for regulation of said self-sufficient supply voltage (V0).

7. The regulation device (1, 2) for a polyphase rotary electrical machine for a motor vehicle, according to claim 6, wherein said regulation means (15, 16) comprise at least one comparator (16) and a switching element (15) such as a transistor.

8. A polyphase rotary electrical machine for a motor vehicle as in claim 1, which can function as a generator.

* * * * *